United States Patent
Bogojevic et al.

(10) Patent No.: US 12,190,410 B2
(45) Date of Patent: Jan. 7, 2025

(54) AUGMENTING A MEDICAL IMAGE WITH AN INTELLIGENT RULER

(71) Applicant: Brainlab AG, Munich (DE)

(72) Inventors: Aleksander Bogojevic, Munich (DE); Stefanie Knopf, Munich (DE)

(73) Assignee: Brainlab AG, Munich (DE)

( * ) Notice: Subject to any disclaimer, the term of this patent is extended or adjusted under 35 U.S.C. 154(b) by 154 days.

(21) Appl. No.: 18/010,286

(22) PCT Filed: Aug. 21, 2020

(86) PCT No.: PCT/EP2020/073466
§ 371 (c)(1),
(2) Date: Dec. 14, 2022

(87) PCT Pub. No.: WO2022/037789
PCT Pub. Date: Feb. 24, 2022

(65) Prior Publication Data
US 2023/0237711 A1    Jul. 27, 2023

(51) Int. Cl.
*G06T 11/00*    (2006.01)

(52) U.S. Cl.
CPC .......... *G06T 11/00* (2013.01); *G06T 2210/41* (2013.01)

(58) Field of Classification Search
CPC .................. G03C 1/0051; G06T 11/00; G06T 2207/10064; G06T 2207/10068; G06T 2207/10072; G06T 2207/10116; G06T 2207/10132; G06T 2207/30004; G06T 2210/41; G06T 5/00; G06T 7/0012
See application file for complete search history.

(56) References Cited

U.S. PATENT DOCUMENTS

| | | | | |
|---|---|---|---|---|
| 6,160,866 | A * | 12/2000 | Mazess | G01V 5/224 378/54 |
| 7,606,613 | B2 | 10/2009 | Simon et al. | |
| 2010/0102239 | A1* | 4/2010 | Hahn | G06T 5/00 250/363.05 |
| 2013/0322725 | A1* | 12/2013 | Enzmann | G06T 7/181 382/132 |
| 2017/0046842 | A1* | 2/2017 | Yamaguchi | A61B 1/000095 |
| 2018/0014890 | A1 | 1/2018 | Stanton et al. | |

FOREIGN PATENT DOCUMENTS

WO    2020056086 A1    3/2020

OTHER PUBLICATIONS

International Search Report dated May 3, 2021 for PCT/EP2020/073466 16 pages.
Regling, et al., Improved lag screw positioning in the treatment of proximal femur fractures using a novel computer assisted surgery method: a cadaveric study, May 30, 2014, 10 pages.
Uneri, et al., Known-component 3D-2D registration for quality assurance of spine surgery pedicle screw placement, Sep. 30, 2005, 18 pages.

* cited by examiner

*Primary Examiner* — Ming Wu
(74) *Attorney, Agent, or Firm* — Tucker Ellis LLP

(57) ABSTRACT

Disclosed is a computer-implemented method of overlaying a representation of a medical instrument over a two-dimensional medical image. It finds at least one feature point along a detection line which is defined relative to the medical instrument in the medical image, calculates a geometrical quantity based on this feature point and adds the geometrical quantity to the two-dimensional medical image.

18 Claims, 8 Drawing Sheets

AUGMENTING A MEDICAL IMAGE WITH AN INTELLIGENT RULER

RELATED APPLICATION DATA

This application is a National Phase application of International Application No. PCT/EP2020/073466, filed Aug. 21, 2020, the contents of which are incorporated herein by reference.

FIELD OF THE INVENTION

The present invention relates to a computer-implemented method for augmenting a two-dimensional medical image showing at least a part of a patient, a corresponding computer program, a computer-readable storage medium storing such a program and a computer executing the program.

TECHNICAL BACKGROUND

In planning a medical intervention, it is often necessary to measure geometrical quantities, for example, a length, an area or an angle. If the desired quantity lies within the patient, this measurement is performed on the two-dimensional medical image of the patient, like an x-ray image or an ultrasound image.

The present invention has the object of simplifying this measurement and/or making it in real time.

The present invention can be used for screw placement procedures e.g. in connection with a system for image-guided surgery such as Curve or Kick®, both products of Brainlab AG.

Aspects of the present invention, examples and exemplary steps and their embodiments are disclosed in the following. Different exemplary features of the invention can be combined in accordance with the invention wherever technically expedient and feasible.

EXEMPLARY SHORT DESCRIPTION OF THE INVENTION

The method according to the present invention overlays a representation of a medical instrument over a two-dimensional medical image. It finds at least one feature point, along a detection line which is defined relative to the medical instrument, in the medical image, calculates a geometrical quantity based on this feature point and adds the geometrical quantity to the two-dimensional medical image.

In the following, a description of the specific features of the present invention is given which shall not be understood to limit the invention only to the features or a combination of the features described in this section.

GENERAL DESCRIPTION OF THE INVENTION

In general, the invention reaches the aforementioned object by providing, in a first aspect, a computer-implemented method of augmenting a two-dimensional medical image showing at least a part of a patient. The method comprises executing, on at least one processor of at least one computer, for example at least one computer being part of a navigation system, the following exemplary steps which are executed by the at least one processor.

In a (for example first) exemplary step, a spatial position of a medical instrument is acquired. In this document, a spatial position is a combination of a spatial location in up to three translational dimensions and an alignment in up to three rotational dimensions.

The spatial position of the medical instrument is for example defined relative to the patient, that is in a reference system of the patient, or relative to a medical navigation system which tracks the medical instrument, that is in a reference system of the medical navigation system.

In a (for example second) exemplary step, the two-dimensional medical image is acquired. The two-dimensional medical image is a sectional image which images a particular (virtual) plane of the patient, which is also referred to as the imaged plane.

In a (for example third) exemplary step, a representation of the medical instrument is overlaid over the two-dimensional medical image. The representation is for example a graphical object which for example has the same shape as the real medical instrument or a similar shape. The orientation of the representation of the medical instrument in the two-dimensional image for example corresponds to the orientation of the medical instrument relative to the imaged plane which is imaged by the two-dimensional medical image. In other words, the representation of the medical instrument is overlaid as if it was imaged together with the two-dimensional medical image. Overlaying the representation of the medical instrument for example means adding the representation as a graphical object to the two-dimensional medical image.

In a (for example fourth) exemplary step, at least one feature point along a detection line defined relative to the medical instrument in the two-dimensional medical image is found based on the spatial position of the medical instrument. The detection line is a virtual line having a known or predetermined position and/or orientation relative to the medical instrument, for example the tip of the medical instrument. The location is for example defined relative to the tip of the medical instrument, for example in that the tip of the medical instrument lies on the detection line, and the orientation is for example parallel to the longitudinal axis of the medical instrument. The tip of the medical instrument is the distal end of the medical instrument and is for example defined as a particular point, such as the center of the distal end surface of the medical instrument.

The at least one feature point has a corresponding position in the two-dimensional medical image. A feature point can be any point of interest, such as an edge point which lies on the contour or boundary of a structure which is imaged in the two-dimensional medical image, a bright point or a dark point. A bright point is for example a point which has a brightness above a predetermined threshold, wherein this threshold can be absolute or relative to the brightest point of the two-dimensional medical image. A bright point could also be the brightest point, for example of the complete two-dimensional medical image or within an area of the two-dimensional medical image defined relative to the detection line. A dark point is for example a point which has a brightness below a predetermined threshold, wherein this threshold can be absolute or relative to the brightest or darkest point of the two-dimensional medical image. A dark point could also be the darkest point, for example of the complete two-dimensional medical image or within an area of the two-dimensional medical image defined relative to the detection line.

In a (for example fifth) exemplary step, a numerical value representing a length, an area or an angle is calculated from the position of the at least one feature point in the two-dimensional medical image. The numerical value is thus a geometrical quantity. Several examples of calculating the numerical value will be given below. It shall be noted that the numerical value is not given in pixels, but rather in meaningful physical units applicable to the patient, like cm, mm or inches.

In a (for example sixth) exemplary step, the calculated numerical value is overlaid over the two-dimensional medical image. This means that the two-dimensional medical image is augmented by overlaying both the representation of the medical instrument and the calculated numerical value.

In one implementation, the detection line is overlaid over the two-dimensional medical image. In this implementation, not only the medical instrument in terms of its representation becomes perceivable by an operator, but also the detection line. This can aid in positioning the medical instrument.

The step of overlaying the representation of the medical instrument, finding the at least one feature point, calculating a numerical value and overlaying the calculated numerical value is for example repeated several times such that the numerical value is calculated and overlaid in real time, for example as the medical instrument is moved relative to the patient.

In one embodiment, acquiring the two-dimensional medical instrument involves calculating the two-dimensional medical image from a three-dimensional medical image dataset based on the spatial position of the medical instrument. The two-dimensional medical image is thus a slice of the three-dimensional medical image dataset. The slice lies in an imaged plane, and an instrument axis of the medical instrument preferably lies in the imaged plane. The rotation of the imaged plane about the instrument axis is for example predefined. If, for example, the medical instrument is a pointer, the longitudinal axis of the pointer is the instrument axis.

The spatial position of the medical instrument upon which the calculation of the two-dimensional medical image is based, is for example defined relative to the three-dimensional medical image dataset. In this case, the three-dimensional medical image dataset is registered with the actual position of the patient such that a three-dimensional medical image dataset has the same (virtual) spatial position as the patient. In this embodiment, the reference system of a medical navigation system can be used. The position of the medical instrument is tracked in the reference system of the medical navigation system, for example using a marker device attached to the medical instrument.

If the imaged plane is defined as described above, the orientation of the two-dimensional medical image about an axis which is perpendicular to the imaged plane is basically arbitrary. However, in one implementation, the two-dimensional medical image has an orientation about this axis such that the horizontal axis or the vertical axis of the two-dimensional medical image is parallel to a body axis of the patient.

In another implementation, the imaged plane is an anatomical plane of the patient. Anatomical planes are the coronal or frontal plane, the horizontal, axial or transverse plane and the sagittal or longitudinal plane. The imaged plane can be a predetermined plane, such as an anatomical plane. However, the imaged plane can be set by an operator, for example in the three-dimensional medical image dataset from which the two-dimensional medical image is calculated. In this implementation, the representation of the medical instrument is a projection of the medical instrument into the imaged plane. The feature points are then found along the projection of the corresponding detection line into the imaged plane.

In this implementation, the imaged plane remains constant rather than being adapted to the movement of the medical instrument. However, it is possible to switch between a plurality of imaged planes depending on the position of the medical instrument. The imaged plane can for example be the anatomical plane to which the longitudinal axis of the medical instrument has the smallest angle. In one example, the location of the imaged plane is selected such that the tip of the medical instrument lies in the imaged plane. This is also referred to as in-line-view. Details of this approach are described in the European patent EP 3 413 773 B1.

In one embodiment, the numerical value is overlaid at a position of a corresponding feature point. This means that the numerical value is not shown at border of the two-dimensional image or an information area of the two-dimensional medical image, but rather at a position to which the numerical value belongs. In one implementation, the distance between the position at which the numerical value is overlaid and a position of the corresponding feature point is less than 20%, 10%, 5% or 2% of the width or height of the two-dimensional medical image. In this example, the numerical value can be perceived immediately together with the feature point to which it belongs.

In one embodiment, the detection line corresponds to a longitudinal axis of the medical instrument. This in particular applies to a longitudinal medical instrument, such as a pointer or a rod. Typically, a longitudinal axis runs through the tip of the medical instrument.

In one embodiment, the detection line is perpendicular to a border of a shape which is at a predetermined position relative to the medical instrument. This means that the shape is arranged relative to the medical instrument. The shape can for example be a geometric shape, such as a sphere, a tube or a cylinder, but can also be the shape of an object, such as an implant or at least part of a bone of the patient. In this example, the shape is virtually attached to the medical instrument and thus moved along when the medical instrument is moved. The shape is for example also overlaid over the two-dimensional medical image such that it becomes visible. In particular, the contour of the shape which lies in the imaged plane is overlaid over the two-dimensional medical image.

The shape of an implant can for example be taken from a database of implants or can be defined using parameters. A shape of at least a part of the patient's bone can be acquired from a medical 3D image of the patient, for example from the three-dimensional medical image dataset from which the two-dimensional medical image is calculated.

In this example, a numerical value corresponding to the shape can be calculated and presented.

In one embodiment, there is not a single detection line defined relative to the medical instrument, but a plurality of detection lines. The method then involves finding at least one feature point along each of the detection lines and calculating a numerical value for each of the at least one feature point per detection line. It is then possible to overlay all calculated numerical values over the two-dimensional medical image or at least one calculation result derived from the plurality of numerical values. The calculation result can for example be the smallest one out of the plurality of numerical values, the largest one of the plurality of numerical values, an average value of the plurality of numerical values or any other suitable value.

In one example, the numerical value represents the distance between a distal end or tip of the medical instrument and the position of the at least one feature point. In this example, the detection line can generally run through the tip of the medical instrument, but this is not mandatory. Alternatively, the numerical value represents the distance between the feature point and an intersection point of the detection line and the longitudinal axis of the medical instrument. In this implementation, it is advantageous to overlay both the longitudinal axis of the medical instrument and the detection line over the two-dimensional medical image.

In one embodiment, finding at least one feature point along the detection line involves finding two feature points on edges, and thus on the contour, of one or more structures shown in the two-dimensional medical image and the numerical value is calculated as the distance between the two feature points. In this embodiment, the distance between two structures or the width of a structure can for example be determined. Typical examples of structures are bones of the patient.

In one embodiment, the feature point lies in a gap between two edges of at least one structure of the patient shown in the two-dimensional medical image and the numerical value is calculated as the distance of the feature point from another edge of the structure of the patient in a direction perpendicular to an image plane of the two-dimensional medical image. In other words, a depth under a gap is determined. In this embodiment, the imaged plane of the two-dimensional medical image corresponds to the image plane. In an example, the feature point lies, in the imaged plane, in a recess of a bone and the numerical value represents the depth of the recess at a position of the feature point.

In the above embodiments, there can be a plurality of parallel detection lines, for example at equidistant intervals. For each of the detection lines, a numerical value, for example the distance between a feature point and the longitudinal axis of the medical instrument, the distance between two feature points or the depth of a gap, is calculated and a calculation result is overlaid by the two-dimensional medical image. As explained above, the calculation result can be the minimum, the maximum or the average of the plurality of numerical values. In this embodiment, it is possible to overlay only one of the detection lines, together with the calculated value, over the two-dimensional medical image, for example the detection line for which the calculated numerical value is the smallest or the largest.

In one embodiment, the numerical value represents an angle, in particular an angle between two lines. A line is for example the detection line, the longitudinal axis of the medical instrument, a line defined by a feature point and another point, like the tip of the medical instrument or another feature point, or a line defined by a structure, like a bone, shown in the two-dimensional medical image. This disclosure includes all possible combinations of the types of lines mentioned above.

In one embodiment, the numerical value represents the size of an area occupied by a structure of the patient in the two-dimensional medical image through which the detection line runs. This means that the detection line crosses the boundary or contour of the structure twice. The area within this boundary has a particular size which is represented by the numerical value.

In one embodiment, finding at least one feature point along the detection line involves finding two feature points being points on edges of a structure shown in the two-dimensional medical image and the numerical value is calculated as a length of the contour of the structure in the two-dimensional medical image between the two feature points. The edges of a structure represent the contour or boundary of the structure and the numerical value is the length of the path between the two feature points along this contour. In a variation of this embodiment, two or more numerical values are calculated as the lengths of different paths along the contour between the two feature points. This is because there are typically two paths between the two feature points along the contour of the structure, namely, starting from one of the feature points, one being clockwise and one being counter-clockwise.

In one embodiment, the method further involves the steps of selecting one of the at least one feature points as a first feature point, finding at least one second feature point along a detection line defined relative to the medical instrument in the two-dimensional medical image, calculating a second numerical value representing a distance between the first feature point and the second feature point and overlaying the calculated second numerical value over the two-dimensional medical image. In this embodiment, the second numerical value can be the only numerical value which is overlaid over the two-dimensional medical image.

In this embodiment, the first feature point can also be referred to as the feature point of interest. This feature point of interest is the reference for a subsequent calculation of a numerical value of interest. In one implementation, the second feature point is the point on the detection line through which a line perpendicular to the detection line starts that also runs through the first feature point. In other words, the second numerical value is then the shortest distance of the first feature point to the detection line.

In one embodiment, finding at least one feature point along the detection line involves finding a plurality of feature points and calculating the numerical value involves calculating a plurality of partial numerical values based on the plurality of feature points and combining the plurality of partial numerical values into the numerical value which is overlaid. Combining the plurality of partial numerical values for example involves calculating the sum of the partial numerical values.

One application of this embodiment is finding a suitable length of a screw for attaching two or more fragments of a bone. The feature points are points lying on the edges of the bone fragments at positions crossed by the detection line. The partial numerical values are the distances between two adjacent feature points which lie on the contour of the same bone fragment. They thus represent the thickness of the bone fragment along the detection line. The numerical value then represents the sum of the thicknesses of the bone fragments without the gaps therebetween.

In one modification of this embodiment, a plurality of numerical values is calculated from the partial numerical values. In a specific implementation, a numerical value associated with a feature point is the sum of all partial numerical values associated with the feature points between the feature point and the tip of the medical instrument. In the application with respect to the bone fragments mentioned above, the numerical values constantly increase and represent the accumulated thicknesses of the bone fragments up to the corresponding feature point, starting from the tip of the medical instrument. In this application, the highest numerical value for example defines the maximum length of a screw, and the second-largest value defines the minimum length of the screw required to connect all bone fragments.

In one embodiment, a template, for example of a medical implant, is selected from a data base based on one or more calculated numerical value(s). For example, the best fitting template for a particular surgery can be found. For this purpose, the one or more calculated numerical value(s) can be used as search parameter(s) when accessing the database.

In one embodiment, a plurality of numerical values are calculated, for example for different spatial positions of the medical instrument, and overlaid over the same two-dimensional medical image. In this embodiment, multiple measurements can be frozen on a screen.

In a second aspect, the invention is directed to a computer program comprising instructions which, when the program is executed by at least one computer, causes the at least one computer to carry out method according to the first aspect. The invention may alternatively or additionally relate to a physical carrier carrying information which represents the program, for example the aforementioned program, which for example comprises code means which are adapted to perform any or all of the steps of the method according to the first aspect. A computer program stored on a disc is a data file, and when the file is read out and transmitted it becomes a data stream for example in the form of a (physical, for example electrical, for example technically generated) signal.

In a third aspect, the invention is directed to a computer-readable storage medium on which the program according to the second aspect is stored. The program storage medium is for example non-transitory.

In a fourth aspect, the invention is directed to at least one computer (for example, a computer), comprising at least one processor (for example, a processor), wherein the program according to the second aspect is executed by the processor, or wherein the at least one computer comprises the computer-readable storage medium according to the third aspect.

For example, the invention does not involve or in particular comprise or encompass an invasive step which would represent a substantial physical interference with the body requiring professional medical expertise to be carried out and entailing a substantial health risk even when carried out with the required professional care and expertise.

For example, the invention does not comprise a step of positioning a medical implant in order to fasten it to an anatomical structure or a step of fastening the medical implant to the anatomical structure or a step of preparing the anatomical structure for having the medical implant fastened to it. More particularly, the invention does not involve or in particular comprise or encompass any surgical or therapeutic activity. The invention is instead directed as applicable to augmenting an image. For this reason alone, no surgical or therapeutic activity and in particular no surgical or therapeutic step is necessitated or implied by carrying out the invention.

Definitions

In this section, definitions for specific terminology used in this disclosure are offered which also form part of the present disclosure.
Computer Implemented Method The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term computer includes a server resource. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

The invention also relates to a computer program comprising instructions which, when on the program is executed by a computer, cause the computer to carry out the method or methods, for example, the steps of the method or methods, described herein and/or to a computer-readable storage medium (for example, a non-transitory computer-readable storage medium) on which the program is stored and/or to a computer comprising said program storage medium which represents the program, for example the aforementioned program, which for example comprises code means which are adapted to perform any or all of the method steps described herein. The invention also relates to a computer comprising at least one processor and/or the aforementioned computer-readable storage medium and for example a memory, wherein the program is executed by the processor.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

Acquiring Data

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing (and e.g. outputting) the data by means of a computer and for example within the framework of the method in accordance with the invention. A step of "determining" as described herein for example comprises or consists of issuing a command to perform the determination described herein. For example, the step comprises or consists of issuing a command to cause a computer, for example a remote computer, for example a remote server, for example in the cloud, to perform the determination. Alternatively or additionally, a step of "determination" as described herein for example comprises or consists of receiving the data resulting from the determination described herein, for example receiving the resulting data from the remote computer, for example from that remote computer which has been caused to perform the determination. The meaning of "acquiring data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device).

Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

Registering

The n-dimensional image of a body is registered when the spatial location of each point of an actual object within a space, for example a body part in an operating theatre, is assigned an image data point of an image (CT, MR, etc.) stored in a navigation system.

Image Registration

Image registration is the process of transforming different sets of data into one co-ordinate system. The data can be multiple photographs and/or data from different sensors, different times or different viewpoints. It is used in computer vision, medical imaging and in compiling and analysing images and data from satellites. Registration is necessary in order to be able to compare or integrate the data obtained from these different measurements.

Marker

It is the function of a marker to be detected by a marker detection device (for example, a camera or an ultrasound receiver or analytical devices such as CT or MRI devices) in such a way that its spatial position (i.e. its spatial location and/or alignment) can be ascertained. The detection device is for example part of a navigation system. The markers can be active markers. An active marker can for example emit electromagnetic radiation and/or waves which can be in the infrared, visible and/or ultraviolet spectral range. A marker can also however be passive, i.e. can for example reflect electromagnetic radiation in the infrared, visible and/or ultraviolet spectral range or can block x-ray radiation. To this end, the marker can be provided with a surface which has corresponding reflective properties or can be made of metal in order to block the x-ray radiation. It is also possible for a marker to reflect and/or emit electromagnetic radiation and/or waves in the radio frequency range or at ultrasound wavelengths. A marker preferably has a spherical and/or spheroid shape and can therefore be referred to as a marker sphere; markers can however also exhibit a cornered, for example cubic, shape.

Marker Device

A marker device can for example be a reference star or a pointer or a single marker or a plurality of (individual) markers which are then preferably in a predetermined spatial relationship. A marker device comprises one, two, three or more markers, wherein two or more such markers are in a predetermined spatial relationship. This predetermined spatial relationship is for example known to a navigation system and is for example stored in a computer of the navigation system.

In another embodiment, a marker device comprises an optical pattern, for example on a two-dimensional surface. The optical pattern might comprise a plurality of geometric shapes like circles, rectangles and/or triangles. The optical pattern can be identified in an image captured by a camera, and the position of the marker device relative to the camera can be determined from the size of the pattern in the image, the orientation of the pattern in the image and the distortion of the pattern in the image. This allows determining the relative position in up to three rotational dimensions and up to three translational dimensions from a single two-dimensional image.

The position of a marker device can be ascertained, for example by a medical navigation system. If the marker device is attached to an object, such as a bone or a medical instrument, the position of the object can be determined from the position of the marker device and the relative position between the marker device and the object. Determining this relative position is also referred to as registering the marker device and the object. The marker device or the object can be tracked, which means that the position of the marker device or the object is ascertained twice or more over time.

Marker Holder

A marker holder is understood to mean an attaching device for an individual marker which serves to attach the marker to an instrument, a part of the body and/or a holding element of a reference star, wherein it can be attached such that it is stationary and advantageously such that it can be detached. A marker holder can for example be rod-shaped and/or cylindrical. A fastening device (such as for instance a latching mechanism) for the marker device can be provided at the end of the marker holder facing the marker and assists in placing the marker device on the marker holder in a force fit and/or positive fit.

Pointer

A pointer is a rod which comprises one or more—advantageously, two—markers fastened to it and which can be used to measure off individual co-ordinates, for example spatial co-ordinates (i.e. three-dimensional co-ordinates), on a part of the body, wherein a user guides the pointer (for example, a part of the pointer which has a defined and advantageously fixed position with respect to the at least one marker attached to the pointer) to the position corresponding to the co-ordinates, such that the position of the pointer can be determined by using a surgical navigation system to detect the marker on the pointer. The relative location between the markers of the pointer and the part of the pointer used to measure off co-ordinates (for example, the tip of the pointer) is for example known. The surgical navigation system then enables the location (of the three-dimensional co-ordinates) to be assigned to a predetermined body structure, wherein the assignment can be made automatically or by user intervention.

Reference Star

A "reference star" refers to a device with a number of markers, advantageously three markers, attached to it, wherein the markers are (for example detachably) attached to the reference star such that they are stationary, thus providing a known (and advantageously fixed) position of the markers relative to each other. The position of the markers relative to each other can be individually different for each reference star used within the framework of a surgical navigation method, in order to enable a surgical navigation system to identify the corresponding reference star on the basis of the position of its markers relative to each other. It is therefore also then possible for the objects (for example, instruments and/or parts of a body) to which the reference star is attached to be identified and/or differentiated accordingly. In a surgical navigation method, the reference star serves to attach a plurality of markers to an object (for example, a bone or a medical instrument) in order to be able to detect the position of the object (i.e. its spatial location and/or alignment). Such a reference star for example features a way of being attached to the object (for example, a clamp and/or a thread) and/or a holding element which ensures a distance between the markers and the object (for example in order to assist the visibility of the markers to a marker detection device) and/or marker holders which are mechanically connected to the holding element and which the markers can be attached to.

Medical Navigation System

A navigation system, such as a medical navigation system, is understood to mean a system which can comprise: at least one marker device; a transmitter which emits electromagnetic waves and/or radiation and/or ultrasound waves; a receiver which receives electromagnetic waves and/or radiation and/or ultrasound waves; and an electronic data processing device which is connected to the receiver and/or the transmitter, wherein the data processing device (for example, a computer) for example comprises a processor (CPU) and a working memory and advantageously an indicating device for issuing an indication signal (for example, a visual indicating device such as a monitor and/or an audio indicating device such as a loudspeaker and/or a tactile indicating device such as a vibrator) and a permanent data memory, wherein the data processing device processes navigation data forwarded to it by the receiver and can advantageously output guidance information to a user via the indicating device. The navigation data can be stored in the permanent data memory and for example compared with data stored in said memory beforehand.

Imaging Methods

In the field of medicine, imaging methods (also called imaging modalities and/or medical imaging modalities) are used to generate image data (for example, two-dimensional or three-dimensional image data) of anatomical structures (such as soft tissues, bones, organs, etc.) of the human body. The term "medical imaging methods" is understood to mean (advantageously apparatus-based) imaging methods (for example so-called medical imaging modalities and/or radiological imaging methods) such as for instance computed tomography (CT) and cone beam computed tomography (CBCT, such as volumetric CBCT), x-ray tomography, magnetic resonance tomography (MRT or MRI), conventional x-ray, sonography and/or ultrasound examinations, and positron emission tomography. For example, the medical imaging methods are performed by the analytical devices. Examples for medical imaging modalities applied by medical imaging methods are: X-ray radiography, magnetic resonance imaging, medical ultrasonography or ultrasound, endoscopy, elastography, tactile imaging, thermography, medical photography and nuclear medicine functional imaging techniques as positron emission tomography (PET) and Single-photon emission computed tomography (SPECT), as mentioned by Wikipedia.

The image data thus generated is also termed "medical image data". Analytical devices for example are used to generate the image data in apparatus-based imaging methods. The imaging methods are for example used for medical diagnostics, to analyse the anatomical body in order to generate images which are described by the image data. The imaging methods are also for example used to detect pathological changes in the human body. However, some of the changes in the anatomical structure, such as the pathological changes in the structures (tissue), may not be detectable and for example may not be visible in the images generated by the imaging methods. A tumour represents an example of a change in an anatomical structure. If the tumour grows, it may then be said to represent an expanded anatomical structure. This expanded anatomical structure may not be detectable; for example, only a part of the expanded anatomical structure may be detectable. Primary/high-grade brain tumours are for example usually visible on MRI scans when contrast agents are used to infiltrate the tumour. MRI scans represent an example of an imaging method. In the case of MRI scans of such brain tumours, the signal enhancement in the MRI images (due to the contrast agents infiltrating the tumour) is considered to represent the solid tumour mass. Thus, the tumour is detectable and for example discernible in the image generated by the imaging method. In addition to these tumours, referred to as "enhancing" tumours, it is thought that approximately 10% of brain tumours are not discernible on a scan and are for example not visible to a user looking at the images generated by the imaging method.

Elastic Fusion, Image Fusion/Morphing, Rigid

Image fusion can be elastic image fusion or rigid image fusion. In the case of rigid image fusion, the relative position between the pixels of a 2D image and/or voxels of a 3D image is fixed, while in the case of elastic image fusion, the relative positions are allowed to change.

In this application, the term "image morphing" is also used as an alternative to the term "elastic image fusion", but with the same meaning.

Elastic fusion transformations (for example, elastic image fusion transformations) are for example designed to enable a seamless transition from one dataset (for example a first dataset such as for example a first image) to another dataset (for example a second dataset such as for example a second image). The transformation is for example designed such that one of the first and second datasets (images) is deformed, for example in such a way that corresponding structures (for example, corresponding image elements) are arranged at the same position as in the other of the first and second images. The deformed (transformed) image which is transformed from one of the first and second images is for example as similar as possible to the other of the first and second images. Preferably, (numerical) optimisation algorithms are applied in order to find the transformation which results in an optimum degree of similarity. The degree of similarity is preferably measured by way of a measure of similarity (also referred to in the following as a "similarity measure"). The parameters of the optimisation algorithm are for example vectors of a deformation field. These vectors are determined by the optimisation algorithm in such a way as to result in an optimum degree of similarity. Thus, the optimum degree of similarity represents a condition, for example a constraint, for the optimisation algorithm. The bases of the vectors lie for example at voxel positions of one of the first and second images which is to be transformed, and the tips of the vectors lie at the corresponding voxel positions in the transformed image. A plurality of these vectors is preferably provided, for instance more than twenty or a hundred or a thousand or ten thousand, etc. Preferably, there are (other) constraints on the transformation (deformation), for example in order to avoid pathological deformations (for instance, all the voxels being shifted to the same position by the transformation). These constraints include for example the constraint that the transformation is regular, which for example means that a Jacobian determinant calculated from a matrix of the deformation field (for example, the vector field) is larger than zero, and also the constraint that the transformed (deformed) image is not self-intersecting and for example that the transformed (deformed) image does not comprise faults and/or ruptures. The constraints include for example the constraint that if a regular grid is transformed simultaneously with the image and in a corresponding manner, the grid is not allowed to interfold at any of its locations. The optimising problem is for example solved iteratively, for example by means of an optimisation algorithm which is for example a first-order optimisation algorithm, such as a gradient descent algorithm. Other examples of optimisation algorithms include optimisation algorithms which do not use derivations, such as the downhill simplex algorithm, or algorithms which use higher-order derivatives such as Newton-like algorithms. The optimisation algorithm preferably performs a local optimisation. If there is a plurality of local optima, global algorithms such as simulated annealing or generic algorithms can be used. In the case of linear optimisation problems, the simplex method can for instance be used.

In the steps of the optimisation algorithms, the voxels are for example shifted by a magnitude in a direction such that the degree of similarity is increased. This magnitude is preferably less than a predefined limit, for instance less than one tenth or one hundredth or one thousandth of the diameter of the image, and for example about equal to or less than the distance between neighbouring voxels. Large deformations can be implemented, for example due to a high number of (iteration) steps.

The determined elastic fusion transformation can for example be used to determine a degree of similarity (or similarity measure, see above) between the first and second datasets (first and second images). To this end, the deviation between the elastic fusion transformation and an identity transformation is determined. The degree of deviation can for instance be calculated by determining the difference between the determinant of the elastic fusion transformation and the identity transformation. The higher the deviation, the lower the similarity, hence the degree of deviation can be used to determine a measure of similarity.

A measure of similarity can for example be determined on the basis of a determined correlation between the first and second datasets.

BRIEF DESCRIPTION OF THE DRAWINGS

In the following, the invention is described with reference to the appended figures which give background explanations and represent specific embodiments of the invention. The scope of the invention is however not limited to the specific features disclosed in the context of the figures, wherein.

DESCRIPTION OF EMBODIMENTS

Figure 1:
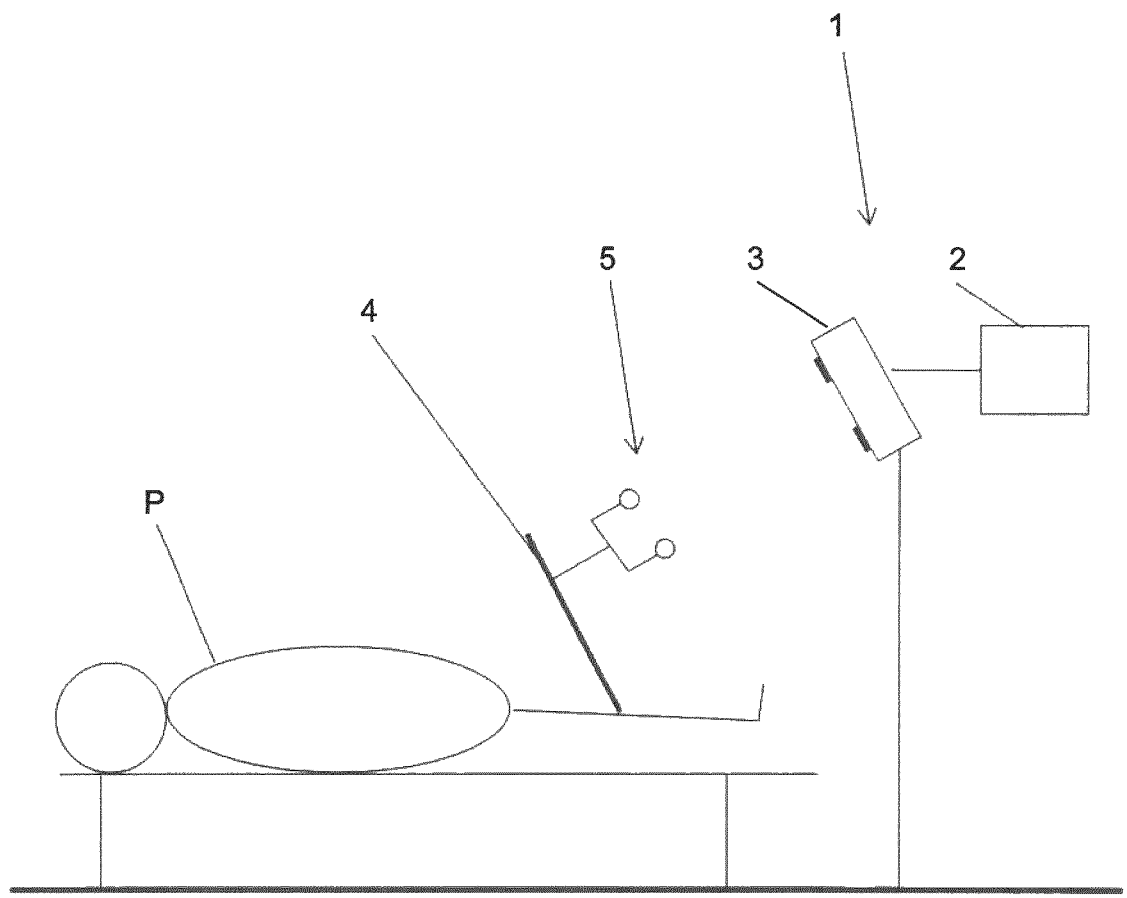
FIG. 1 illustrates an environment in which the invention is used.

FIG. 1 illustrates a scenario in which the present invention is applied. In this scenario, a patient P is positioned, for example on an operating room table. A medical navigation system 1 comprising a computer 2 and a stereoscopic camera 3 is provided. Within the field of view of the stereoscopic camera 3, a medical instrument 4 is provided. The medical instrument 4 has a tip pointing towards the patient P and is provided with a marker device 5 which is recognisable by the stereoscopic camera 3.

The marker device 5 is registered with the medical instrument 4, such that the relative position between the medical instrument 4 and the marker device 5 is known. By tracking the marker device 5, the medical navigation system 1 can ascertain the position of the medical instrument 4 in a reference system of the medical navigation system 1.

The computer 2 stores a three-dimensional medical image dataset of the patient P. This three-dimensional medical image dataset represents at least a part of the internal constitution of the patient P, and for example shows a plurality of bones and/or bone fragments. The three-dimensional medical image dataset is registered with the patient P, which means that it has a position in the reference system of the medical navigation system 1 such that this position corresponds to the position of the patient P in the reference system of the medical navigation system 1.

Figure 2:
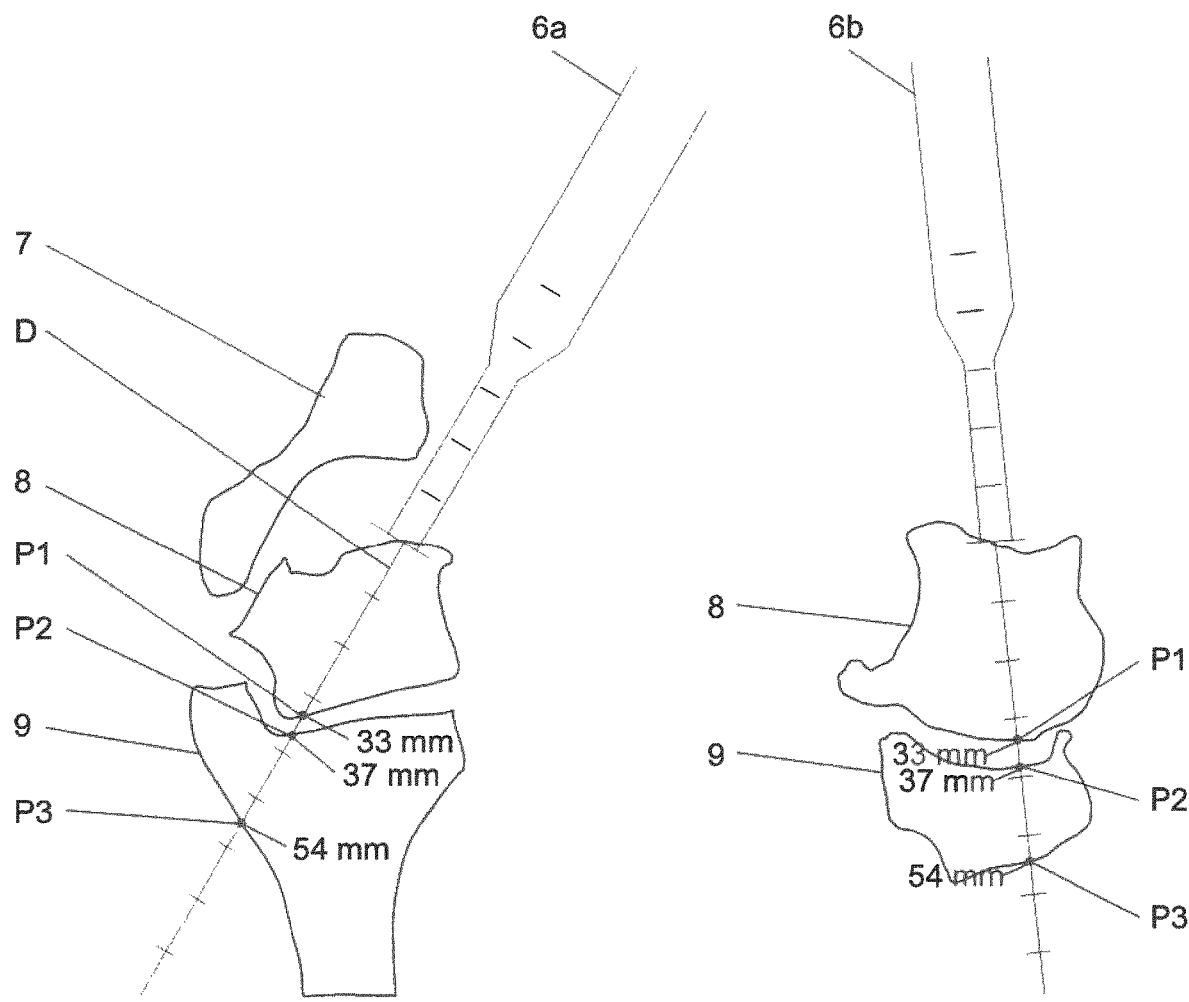
FIG. 2 shows two augmented two-dimensional medical images.

FIG. 2 shows two different two-dimensional medical images for two different imaged planes. The two two-dimensional images are calculated from the three-dimensional medical image dataset showing parts of bone structure of the patient P in terms of the bones 7, 8 and 9.

The medical instrument 4 has an elongated, rod-like shape, such that the medical instrument 4 has a longitudinal axis. The two two-dimensional medical images are augmented by overlaying a representation 6a and 6b, respectively, together with a detection line D which corresponds to the longitudinal axis of the medical instrument 4.

The two imaged planes on which the two two-dimensional medical images are based are slices of the three-dimensional medical image dataset in which the longitudinal axis of the medical instrument 4 lies, but with different viewing angles about this longitudinal axis.

The detection line has distance markings at equidistant intervals such that it acts as ruler in the two-dimensional medical image. An aspect of the present invention is that not only the markings are shown in the two-dimensional medical images, but also numerical values which represent certain measurements. However, it is also possible to omit the markings and just overlay the numerical values.

The detection line D passes through bone fragments 8 and 9. The points in the two-dimensional medical images at which the detection line D crosses the contours of the bone fragments 8 and 9 are marked as P1, P2 and P3, respectively, wherein P1 lies on the contour of bone fragment 8 and feature points P2 and P3 lie on the contour of the bone fragment 9. For each of the feature points P1, P2 and P3, the distance of the respective feature point to the tip of the representation 6 of the medical instrument 4 in the two-dimensional medical image is calculated as a numerical value and overlaid over the two-dimensional medical image. In the present case, the distance between the tip of the representation 6 and the feature point P1 is 33 mm, the distance between the tip of the representation 6 and the feature point P2 is 37 mm and the distance between the tip of the representation 6 and the feature point P3 is 54 mm. This means that the detection line is not a simple ruler, but rather an intelligent ruler which automatically indicates certain geometrical quantities in terms of numerical values.

Instead of or in addition to overlaying the three distances in the two two-dimensional medical images, a numerical value representing the area within a boundary of a bone fragment through which the detection line D passes is calculated and overlaid. This area would be different for the two two-dimensional medical images, for example for the area of the bone fragment 8, since the sectional view differs due to the different viewing directions of the imaged planes.

Figure 3:
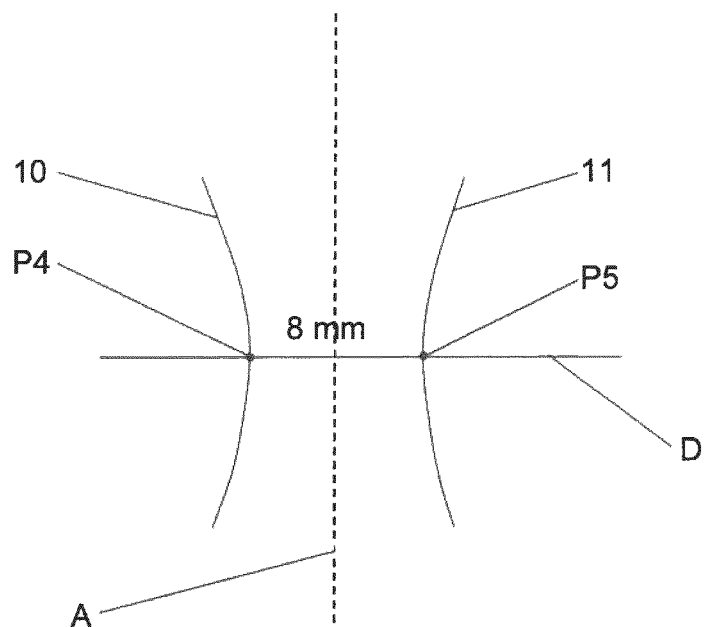
FIG. 3 shows a first approach for calculating a numerical value.

FIG. 3 schematically shows a two-dimensional medical image showing parts of the contours of the bones 10 and 11. It further shows the longitudinal axis A of the medical instrument 4 and a detection line D which is perpendicular to the longitudinal axis A. The representation of the medical instrument 4 is omitted for the sake of perceivability of the important data. The longitudinal axis A lies in the gap between the two bones 10 and 11. The detection line D is at a given and known distance from the tip of the representation 6 of the medical instrument 4. Both the longitudinal axis A and the detection line D are overlaid over the two-dimensional medical image.

The feature points detected in the present embodiment are the points P4 and P5 at which the detection line D intersects with the contour of the bone fragments 10 and 11, respectively. The numerical value is then calculated as the distance between the two feature points P4 and P5 and is then overlaid over the two-dimensional medical image, for example near the intersection of the longitudinal axis A and the detection line D.

Figure 4:
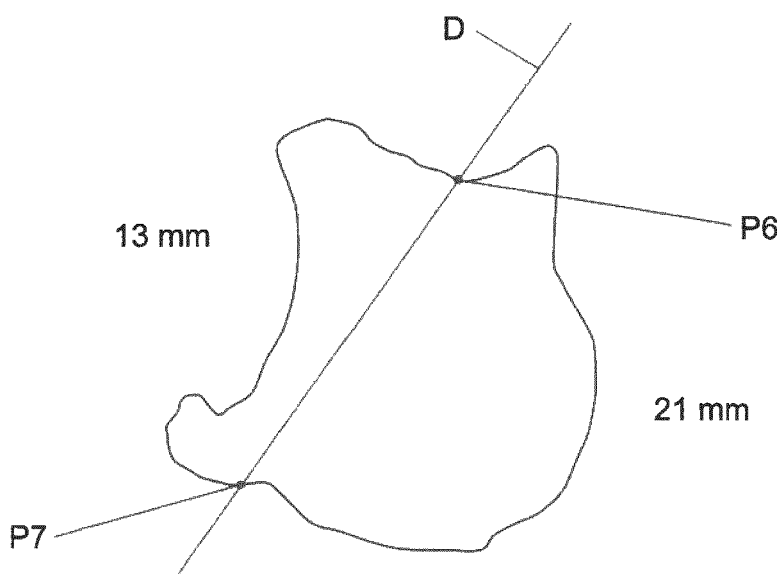
FIG. 4 shows another approach for calculating two numerical values.

FIG. 4 shows another example of a two-dimensional medical image depicting the contour of a bone 11 with an overlaid detection line D. In this embodiment, feature points P6 and P7 at which the detection line D intersects the contour of the bone 12 are found. Then two numerical values are calculated. The first numerical value, in the present example 13 mm, is the length of the contour of the bone fragment 12 from feature point P6 to feature point P7 in a counter-clockwise direction, while the second numerical value, in the present example 21 mm, represents the length of the contour of the bone 12 from feature point P6 to feature point P7 in a clockwise direction.

Figure 5:
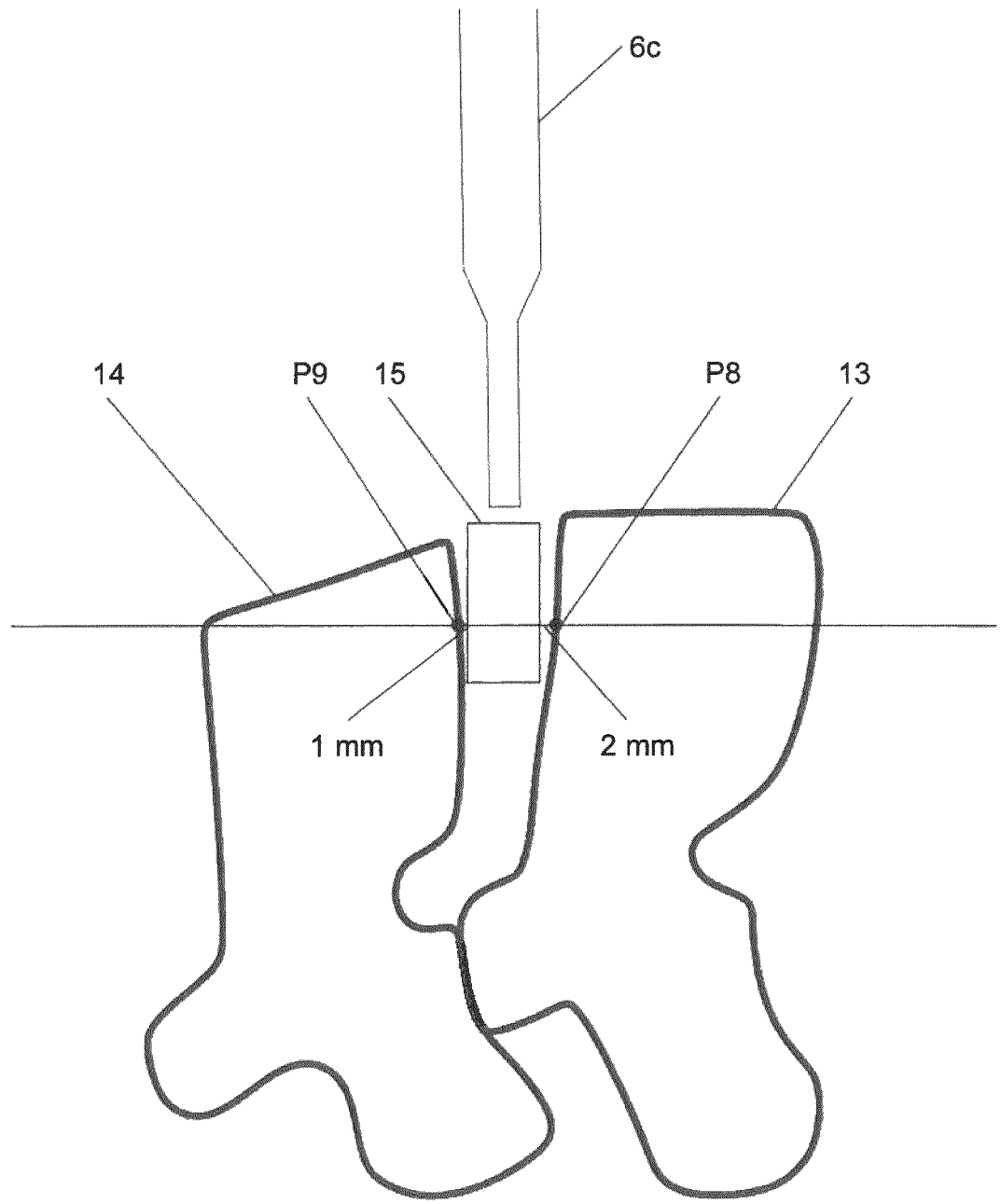
FIG. 5 shows another approach of calculating a numerical value.

FIG. 5 shows an example of a two-dimensional medical image showing two bones 13 and 14 as well as a representation 6*c* of the medical instrument 4 and a shape 15 at a known position relative to the representation 6*c*. In this example, the shape 15 is cylindrical, and has thus a rectangular representation in the two-dimensional medical image. The detection line D is defined relative to the shape 15. Two feature points P8 and P9 are found which are intersections of the detection line D and the contours of the bones 13 and 14, respectively. For each of the feature points P8 and P9, the distance of the feature point to the surface of the shape 15 along the detection line D is calculated as a numerical value and overlaid over the two-dimensional image. In the present example, the shape 15 is cylindrical, but could have any shape, for example the shape of a medical implant. With this embodiment, the distance between the shape 15 and bones of the patient P can be determined, for example for assessing whether or not a particular implant is suitable.

Figure 6:
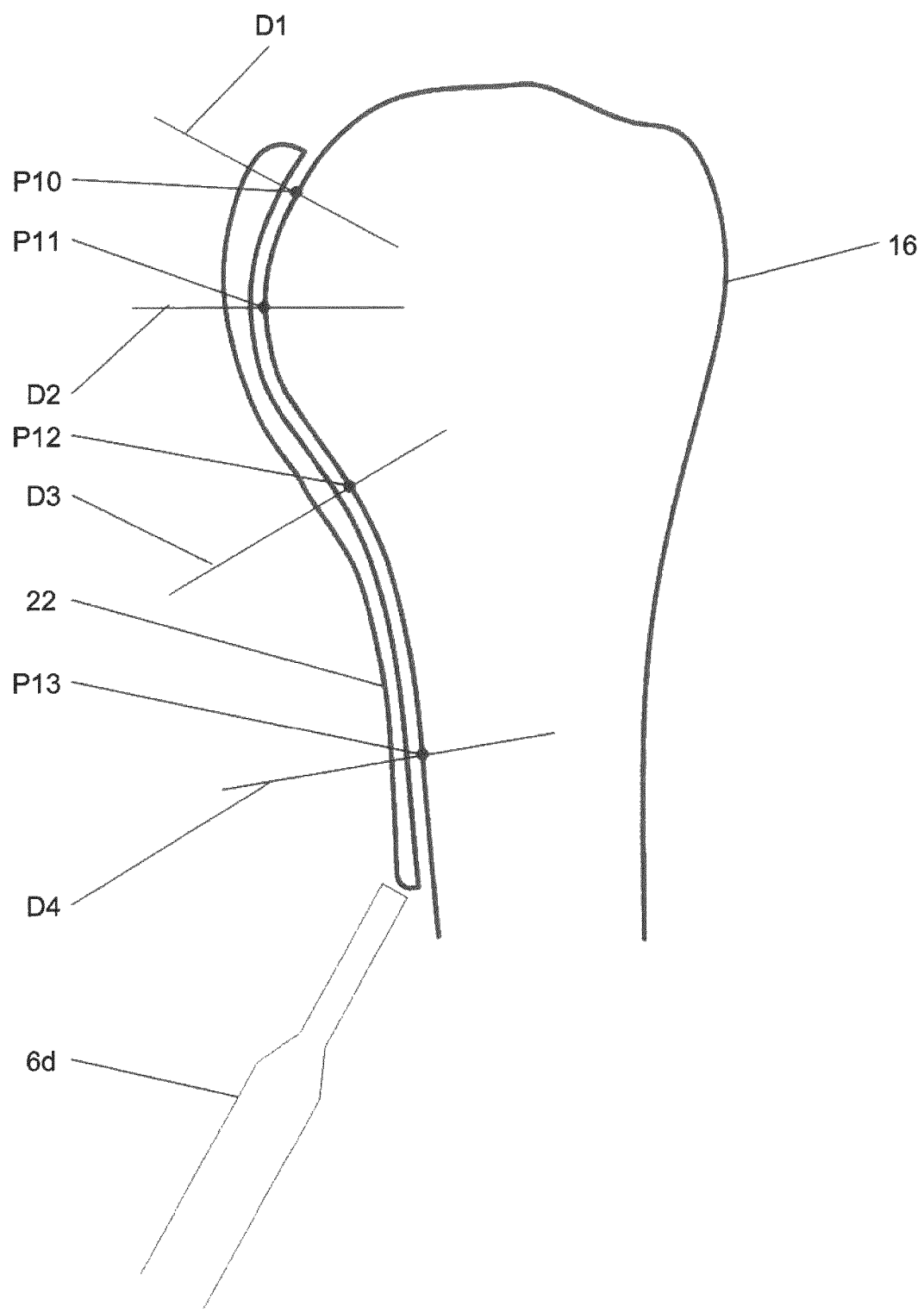
FIG. 6 shows yet another approach of calculating a numerical value.

FIG. 6 shows an example in which the two-dimensional medical image shows a part of the humerus of the patient P in terms of the bone 16. It further shows a shape 22 which is overlaid over the two-dimensional medical image and which represents the shape of an implant which can be attached to the bone 16. The shape 22 is virtually attached to the medical instrument 4, which is shown as its representation 6*d* in the two-dimensional medical image of FIG. 6. The shape 22 moves along with the representation 6*d* if the medical instrument 4 is moved. Assigned to the shape 22 are for example four detection lines D1, D2, D3 and D4 at certain positions of the shape 22 and being for example orthogonal to the surface of the shape 22. For each of the detection lines D1 to D4, a feature point P10 to P13 is found which marks the intersection of the corresponding detection line with the contour of the bone 16. The method calculates, for each feature point P10 to P13, the distance of the respective feature point from the surface of the shape 22, said surface facing the bone 16, along the corresponding detection line. The four calculated numerical values are then overlaid over the two-dimensional medical image such that it is easily conceivable whether or not the implant corresponding to the shape 22 fits the bone 16 or not.

Figure 7:
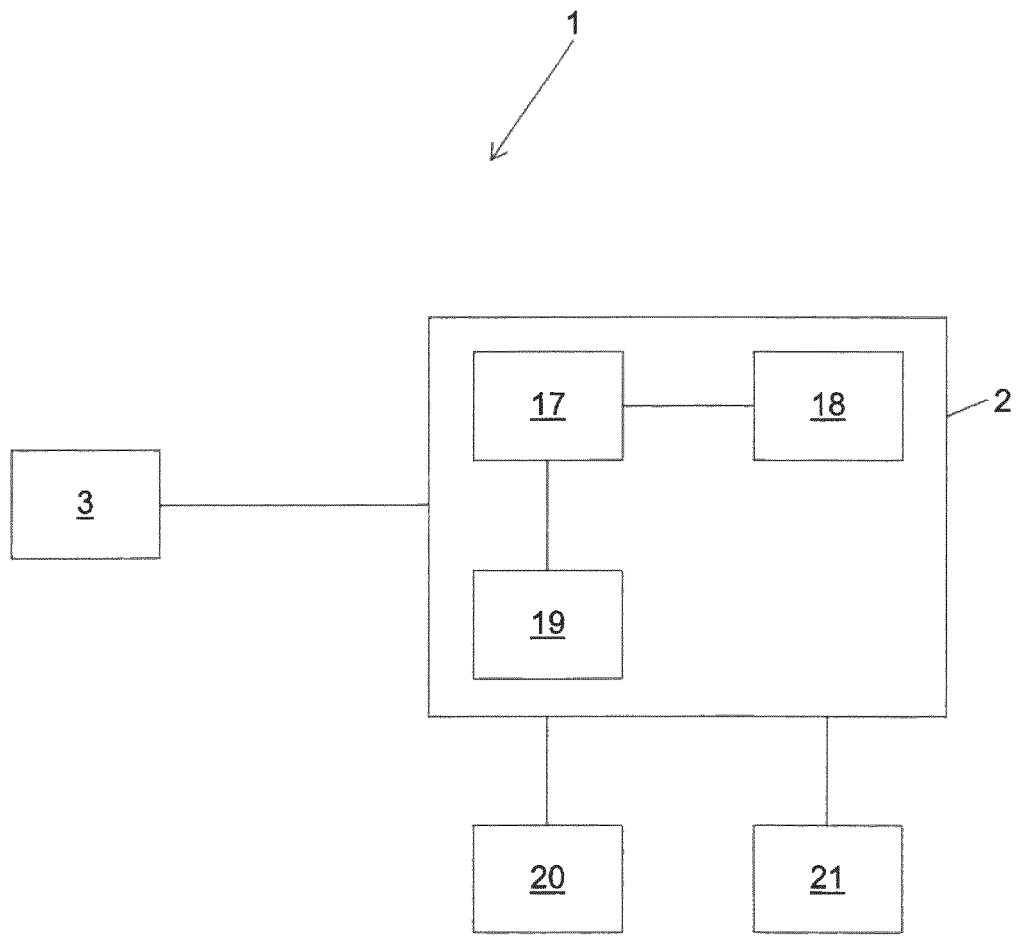
FIG. 7 shows details of a system implementing the invention.

FIG. 7 schematically shows the medical navigation system 1. The medical navigation system 1 comprises the computer 2 and the stereoscopic camera 3 which are connected such that data can be exchanged between them, which at least involves transmitting data from the stereoscopic camera 3 to the computer 2.

The computer 2 comprises a central processing unit 17, a memory 18 and an interface 19. The memory 18 stores data which are processed or are to be processed and computer instructions which let the computer 2 implement the present invention. The interface 19 is used to connect the computer 2 to external devices, like the stereoscopic camera 3, the input device 20 and the output device 21. The input device 20 can be any suitable device, such as a mouse, joystick, a keyboard or a touchpad. The output device 21 can be any suitable device, such as a monitor. The input device 20 and the output device 21 can be combined into one device, like a touch screen.

The central processing unit 17 performs instructions stored in the memory unit 18 and processes data accordingly. In particular, the central processing unit 17 determines, from the stereoscopic camera 3, the position of the medical instrument 4 and calculates a two-dimensional medical image from the three-dimensional medical image dataset stored in the memory unit 18 based on the position of the medical instrument 4 relative to the patient and thus to the three-dimensional medical image dataset. It further overlays a representation of the medical instrument 4 on the two-dimensional medical image, finds feature points in the two-dimensional medical image as explained above, calculates a numerical value as discussed above and overlays the calculated numerical value over the two-dimensional medical image.

It shall be noted that, instead of receiving the position of the medical instrument 4 from the stereoscopic camera 3, the computer 2 can receive a stereoscopic image from the stereoscopic camera 3, analyse the stereoscopic image to determine the position of the marker device 5 and derive the position of the medical instrument 4 therefrom.

Figure 8:
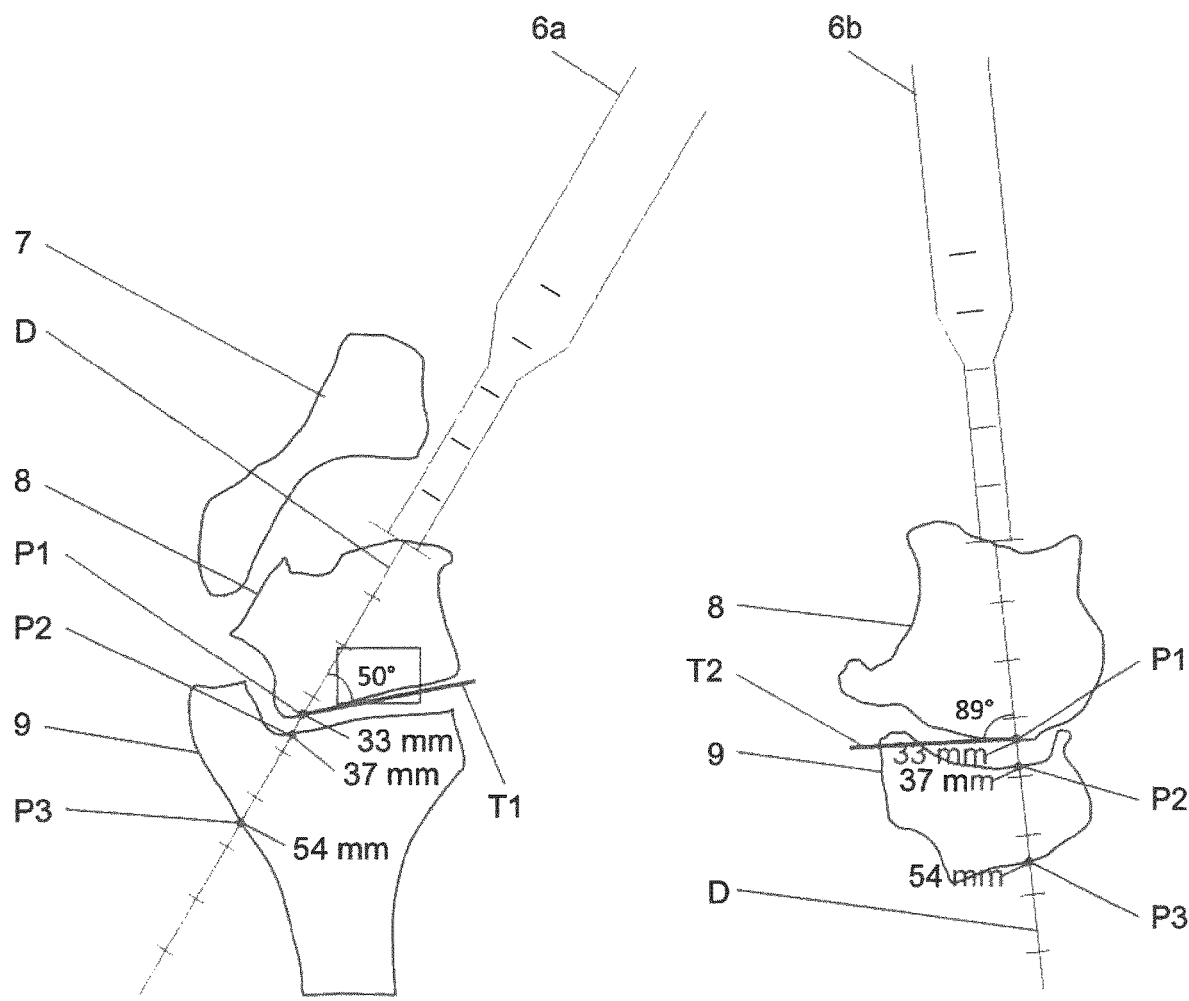
FIG. 8 shows the two augmented two-dimensional medical images of FIG. 2 with additional angles.

FIG. 8 shows the two augmented two-dimensional medical images of FIG. 2 with additional angles, such that the explanation of FIG. 2 applies for like elements.

The left two-dimensional medical image of FIG. 8 further shows a line T1 which is a tangent to the bone fragment 8 at the feature point P1. The angle between the detection line D and the tangent T1, in the present example 50°, is calculated as an additional numerical value and overlaid over the left two-dimensional medical image.

The right two-dimensional medical image of FIG. 8 further shows a line T2 which is a tangent to the bone fragment 8 at the feature point P1 in the view of the right two-dimensional medical image. The angle between the detection line D and the tangent T2, in the present example 89°, is calculated as an additional numerical value and overlaid over the right two-dimensional medical image.

Figure 9:
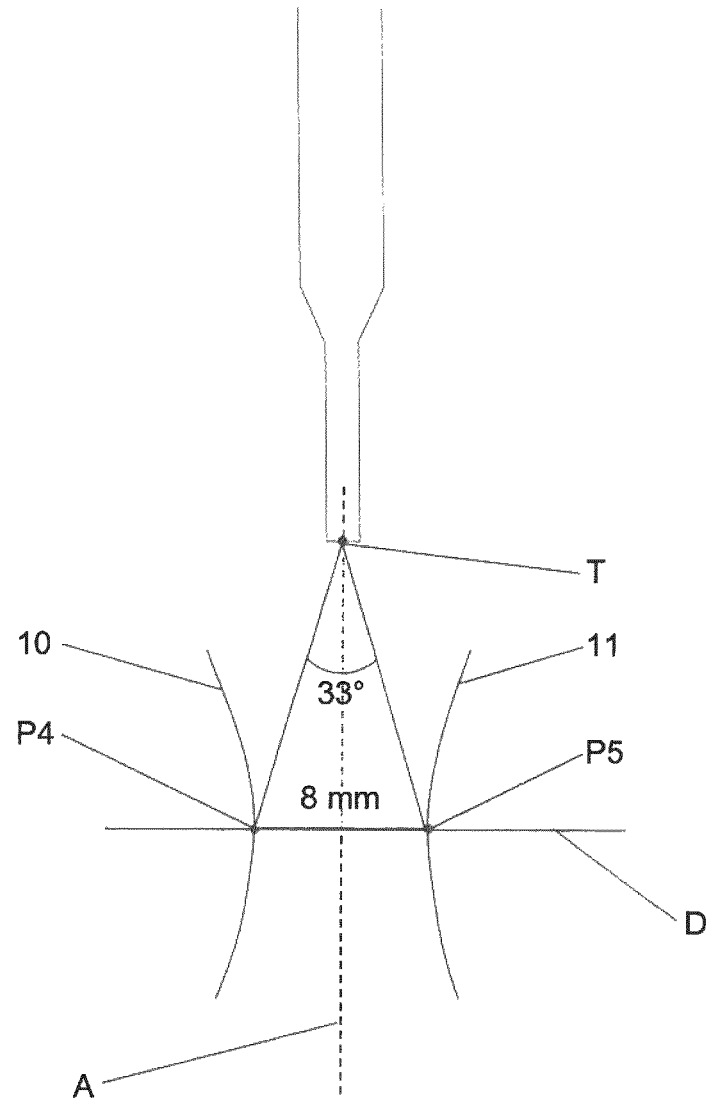
FIG. 9 shows the example of FIG. 3 with an additional angle.

FIG. 9 shows the two-dimensional medical image of FIG. 3 with an additional angle. The point T in FIG. 8 is the point at which the longitudinal axis A of the medical instrument 4 exits the center of the tip of the medical instrument 4. An angle, in the present case 33°, is calculated as an additional numerical value. It represents the angle between the two lines connecting the point P and the feature points P4 and P5, respectively.

It shall be noted that the numerical values representing angles in FIG. 8 and/or 9 can be calculated and overlaid without any one or more of the other numerical values, like the ones representing distances, being calculated and overlaid.

The invention claimed is:

1. A method of augmenting a two-dimensional medical image showing at least a part of an associated patient, the method comprising:
   acquiring a spatial position of an associated medical instrument;
   calculating the two-dimensional medical image from a three-dimensional medical image dataset of the associated patient based on the acquired spatial position of the associated medical instrument;
   overlaying a representation of the associated medical instrument over the two-dimensional medical image;
   finding at least one feature point along a detection line defined relative to the associated medical instrument in the two-dimensional medical image based on the acquired spatial position of the associated medical instrument;
   calculating a numerical value representing one or more of a length, an area, and/or an angle from a position of the at least one feature point in the two-dimensional medical image; and
   overlaying the calculated numerical value over the two-dimensional medical image.

2. The method of claim 1, wherein the at least one feature point comprises one or more of an edge point, a bright point, and/or a dark point.

3. The method of claim 1, wherein the overlaying the calculated numerical value comprises overlaying the calculated numerical value over the two-dimensional medical image at a position of a corresponding feature point.

4. The method of claim 1, wherein the finding the at least one feature point comprises finding the at least one feature point along a line that corresponds to a longitudinal axis of the associated medical instrument.

5. The method of claim 1, wherein the finding the at least one feature point comprises finding the at least one feature point along a line that is perpendicular to a border of a shape associated with the associated medical instrument at a predetermined position relative to the associated medical instrument.

6. The method of claim 4, wherein the calculating the numerical value comprises calculating a numerical value that represents a distance between a distal end of the associated medical instrument and the position of the at least one feature point.

7. The method of claim 1, wherein:
   the finding the at least one feature point along the detection line comprises finding two feature points being points on contours of one or more structures shown in the two-dimensional medical image; and
   the calculating the numerical value comprises calculating the numerical value as the distance between the two feature points.

8. The method of claim 1, wherein the calculating the numerical value comprises calculating a numerical value that represents a size of an area occupied by a structure of the associated patient in the two-dimensional medical image through which the detection line runs.

9. The method of claim 1, wherein:
   the finding the at least one feature point along the detection line comprises finding two feature points being points on a contour of a structure shown in the two-dimensional medical image; and
   the calculating the numerical value comprises calculating the numerical value as a length of the contour of the structure shown in the two-dimensional medical image between the two feature points.

10. The method of claim 1, wherein:
    the finding the at least one feature point comprises finding a feature point that lies in a gap between two edges of at least one structure of the associated patient shown in the two-dimensional medical image; and
    the calculating the numerical value comprises calculating the numerical value as a distance of the feature point that lies in the gap from another edge of a structure of the associated patient in a direction perpendicular to an image plane of the two-dimensional medical image.

11. The method of claim 1, further comprising:
    selecting one of the at least one feature points as a first feature point;
    finding at least one second feature point along a detection line defined relative to the associated medical instrument in the two-dimensional medical image;
    calculating a second numerical value representing a distance between the first feature point and the second feature point; and
    overlaying the calculated second numerical value over the two-dimensional medical image.

12. The method of claim 1, wherein:
    the finding at least one feature point along the detection line comprises finding a plurality of feature points; and
    the calculating the numerical value comprises:
    calculating a plurality of partial numerical values based on the plurality of feature points; and
    combining the plurality of partial numerical values in the numerical value.

13. A computer apparatus comprising:
    a processor;
    non-transient computer-readable storage medium operably coupled with the processor; and computer-readable program instructions stored in the non-transient computer-readable storage medium, wherein the processor is operable to execute the computer-readable program instructions to perform a method of augmenting a two-dimensional medical image showing at least a part of an associated patient comprising:

acquiring a spatial position of an associated medical instrument;

calculating a two-dimensional medical image from a three-dimensional medical image dataset of the associated patient based on the acquired spatial position of the associated medical instrument;

overlaying a representation of the associated medical instrument over the two-dimensional medical image;

finding at least one feature point along a detection line defined relative to the associated medical instrument in the two-dimensional medical image based on the acquired spatial position of the associated medical instrument;

calculating a numerical value representing one or more of a length, an area, and/or an angle from a position of the at least one feature point in the two-dimensional medical image; and overlaying the calculated numerical value over the two-dimensional medical image.

14. A non-transitory computer readable storage medium storing a computer program that when executed by a processor performs a method of augmenting a two-dimensional medical image showing at least a part of an associated patient comprising:

acquiring a spatial position of an associated medical instrument;

calculating a two-dimensional medical image from a three-dimensional medical image dataset of the associated patient based on the acquired spatial position of the associated medical instrument;

overlaying a representation of the associated medical instrument over the two-dimensional medical image;

finding at least one feature point along a detection line defined relative to the associated medical instrument in the two-dimensional medical image based on the acquired spatial position of the associated medical instrument;

calculating a numerical value representing one or more of a length, an area, and/or an angle from a position of the at least one feature point in the two-dimensional medical image; and overlaying the calculated numerical value over the two-dimensional medical image.

15. The computer apparatus according to claim 13, wherein the processor is operable to execute the computer-readable program instructions to:

find the at least one feature point along a line that corresponds to a longitudinal axis of the associated medical instrument.

16. The computer apparatus according to claim 13, wherein the processor is operable to execute the computer-readable program instructions to:

find the at least one feature point along a line that is perpendicular to a border of a shape associated with the associated medical instrument at a predetermined position relative to the associated medical instrument.

17. The non-transitory computer readable storage medium according to claim 14 wherein the computer program when executed by the processor performs a method further comprising:

finding the at least one feature point by finding at least one feature point along a detection line that corresponds to a longitudinal axis of the associated medical instrument.

18. The non-transitory computer readable storage medium according to claim 14 wherein the computer program when executed by the processor performs a method further comprising:

finding the at least one feature point by finding at least one feature point along a detection line that is perpendicular to a border of a shape associated with the associated medical instrument at a predetermined position relative to the associated medical instrument.

* * * * *